United States Patent
Shindoh et al.

[11] Patent Number: 5,931,902
[45] Date of Patent: Aug. 3, 1999

[54] COMMUNICATION SYSTEM

[75] Inventors: Kenji Shindoh; Takayuki Tsuzuki, both of Tokyo, Japan

[73] Assignee: Mitsubishi Denki Kabushiki Kaisha, Tokyo, Japan

[21] Appl. No.: 08/743,732

[22] Filed: Nov. 6, 1996

[30] Foreign Application Priority Data

Aug. 21, 1996 [JP] Japan .................................... 8-220176

[51] Int. Cl.⁶ .................................................. G06F 15/16
[52] U.S. Cl. .............................................. 709/213; 700/3
[58] Field of Search ...................... 364/132, 131; 340/825.06; 345/214; 395/182.11, 182.21, 290, 557, 200.43

[56] References Cited

U.S. PATENT DOCUMENTS

| 4,580,232 | 4/1986 | Dugan et al. | 364/523 |
| 5,070,450 | 12/1991 | Holman et al. | 395/750 |
| 5,349,673 | 9/1994 | Yasuda | 395/800 |
| 5,434,982 | 7/1995 | Calzi | 395/325 |

FOREIGN PATENT DOCUMENTS

| 63-121966 | 5/1988 | Japan . |
| 1-205312 | 8/1989 | Japan . |
| 4-240946 | 8/1992 | Japan . |
| 4-301952 | 10/1992 | Japan . |
| 2209079 | 4/1989 | United Kingdom . |

Primary Examiner—Ellis B. Ramirez
Assistant Examiner—William Titcomb
Attorney, Agent, or Firm—Sughrue, Mion, Zinn, Macpeak & Seas, PLLC

[57] ABSTRACT

A communication system in which a master unit is connected to a slave unit executing initialization processing with a longer period of time for initialization as compared to that by the master unit through an extension bus and a signal line, the signal line becomes an active state according to a reset signal in a process for resetting the system, so that the slave unit executes initialization processing by detecting release of reset according to control by the microprocessor for a slave unit, and when the initialization processing is finished, the slave unit supplies an output signal to the reset signal release circuit, shifts the signal line from the active state to a high impedance state, and releases reset of the master unit.

6 Claims, 5 Drawing Sheets

COMMUNICATION SYSTEM

FIELD OF THE INVENTION

The present invention relates to a communication system, and more particularly to a communication system in which a master unit and one or a plurality of slave units are connected to each other with communication lines and controls are provided for the release of a system reset by means of data communication through the communication lines.

BACKGROUND OF THE INVENTION

Figure 4:
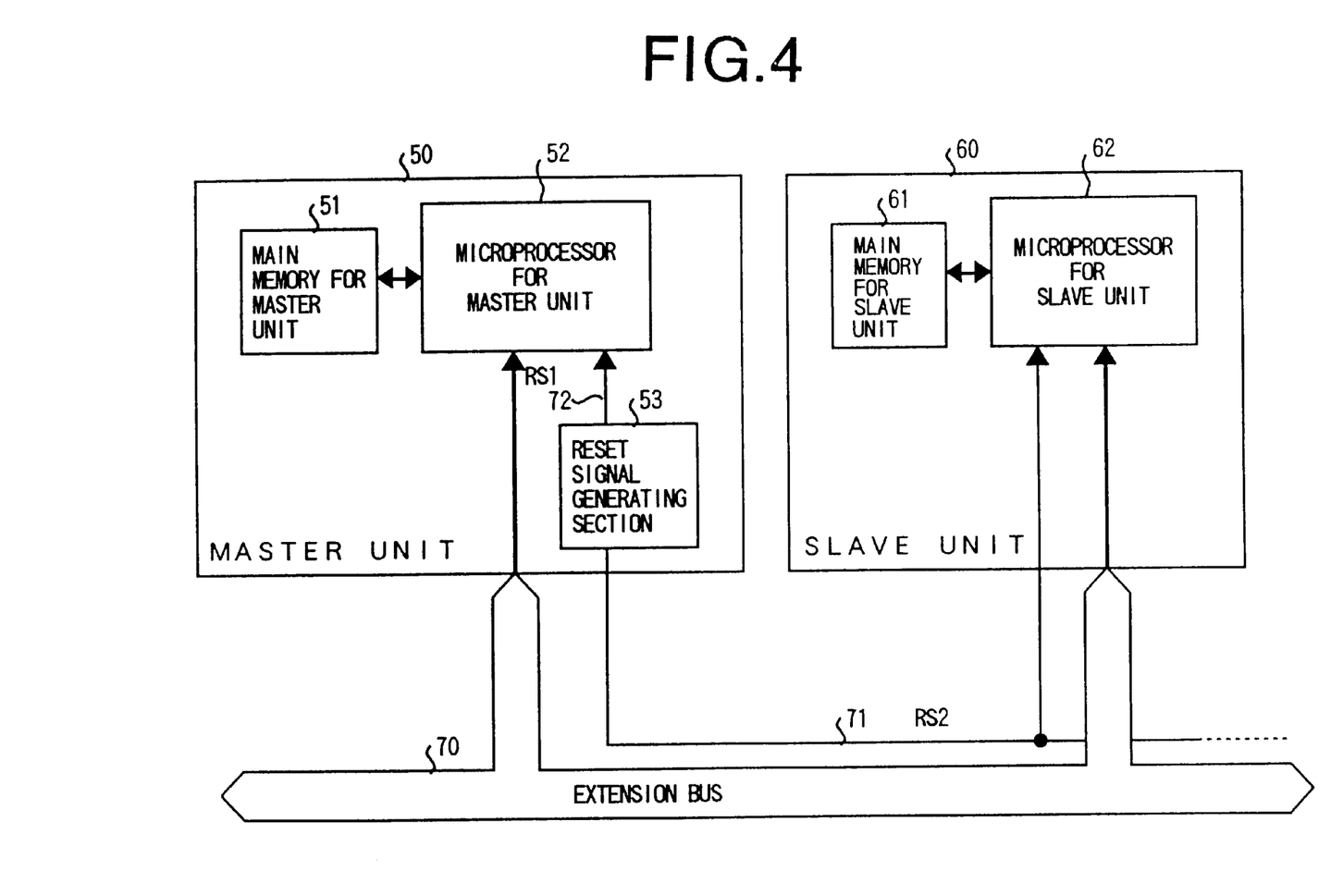
FIG. 4 is a block diagram showing internal configuration of a communication system based on the conventional technology.

FIG. 4 is a block diagram showing internal configuration of a communication system based on the conventional technology. In the communication system shown in this figure, a master unit 50 and a slave unit 60 are connected to each other with an extension bus 70, and data communication between the master unit 50 and the slave unit 60 is executed through the extension bus 70.

The master unit 50 has the configuration in which a main memory 51 for a master unit and a reset signal generating section 53 are connected to a microprocessor 52 for a master unit with a bus. This master unit 50 provides centralized controls over the entire system by means of data communications between the microprocessor 52 for a master unit and each unit inside or an external slave unit 60 connected thereto.

The main memory 51 for a master unit comprises a ROM not shown herein with control programs such as initializing programs enabling operation of the master unit 50 or a RAM not shown herein and used for applications in a work area or the like stored therein. The microprocessor 52 for a master unit accesses the ROM or RAM not shown herein in the main memory 51 for a master unit and executes computing and control sequences.

The reset signal generating section 53 is connected to the microprocessor 52 for a master unit in the master unit 50 as well as to the slave unit 60 (a microprocessor 62 for a slave unit described hereinafter) outside the master unit 50 with a signal line 71 provided apart from the extension bus 70. This reset signal generating section 53 generates reset signals RS1 and RS2 each for system reset, supplies the reset signal RS1, one of the reset signals generated as described above, via the signal line 72 to the microprocessor 52 for a master unit, and also supplies the reset signal RS1, other one of the reset signals described above, via the signal line 71 to the microprocessor 62 for a slave unit described later.

The slave unit 60 has the configuration in which a main memory 61 for a slave unit is connected via a bus to the microprocessor 62 for a slave unit. This slave unit 60 is controlled according to data transmitted from the master unit 50 via the extension bus 70 or the signal line 71.

The main memory 61 for a slave unit stores therein various types of control program in a state where the control programs can be accessed from the microprocessor 62 for a slave unit. The microprocessor 62 for a slave unit controls the entire slave unit 60 according to each control program stored in the main memory 61 for a slave unit.

Next description is made for operations. In the communication system shown in FIG. 4, when a power for the system is turned ON, the reset signal generating section 53 determines that a voltage in each unit has reached a level allowing operation thereof, and releases the reset signal RS1 for the master unit and the reset signal RS2 for the slave unit each having been generated.

After the reset signals RS1 and RS2 are released, each of the master unit 50 and slave unit 60 starts initialization under control by the microprocessor 52 for a master unit and the microprocessor 62 for a slave unit respectively.

For instance, in the master unit 50, the microprocessor 52 for a master unit executes an initialization program stored in the main memory 51 for a master unit and initializes inside of the master unit 50. Also in the slave unit 60, the microprocessor 62 for a slave unit executes an initialization program stored in the main memory 61 for a slave unit and initializes inside of the slave unit 60.

When the master unit 50 finishes initialization, it starts access via the extension bus 70 to the slave unit 60 by sending a data send/receive request or other, so that the slave unit 60 sends a response to the send/receive request from the master unit 50.

Figure 5:
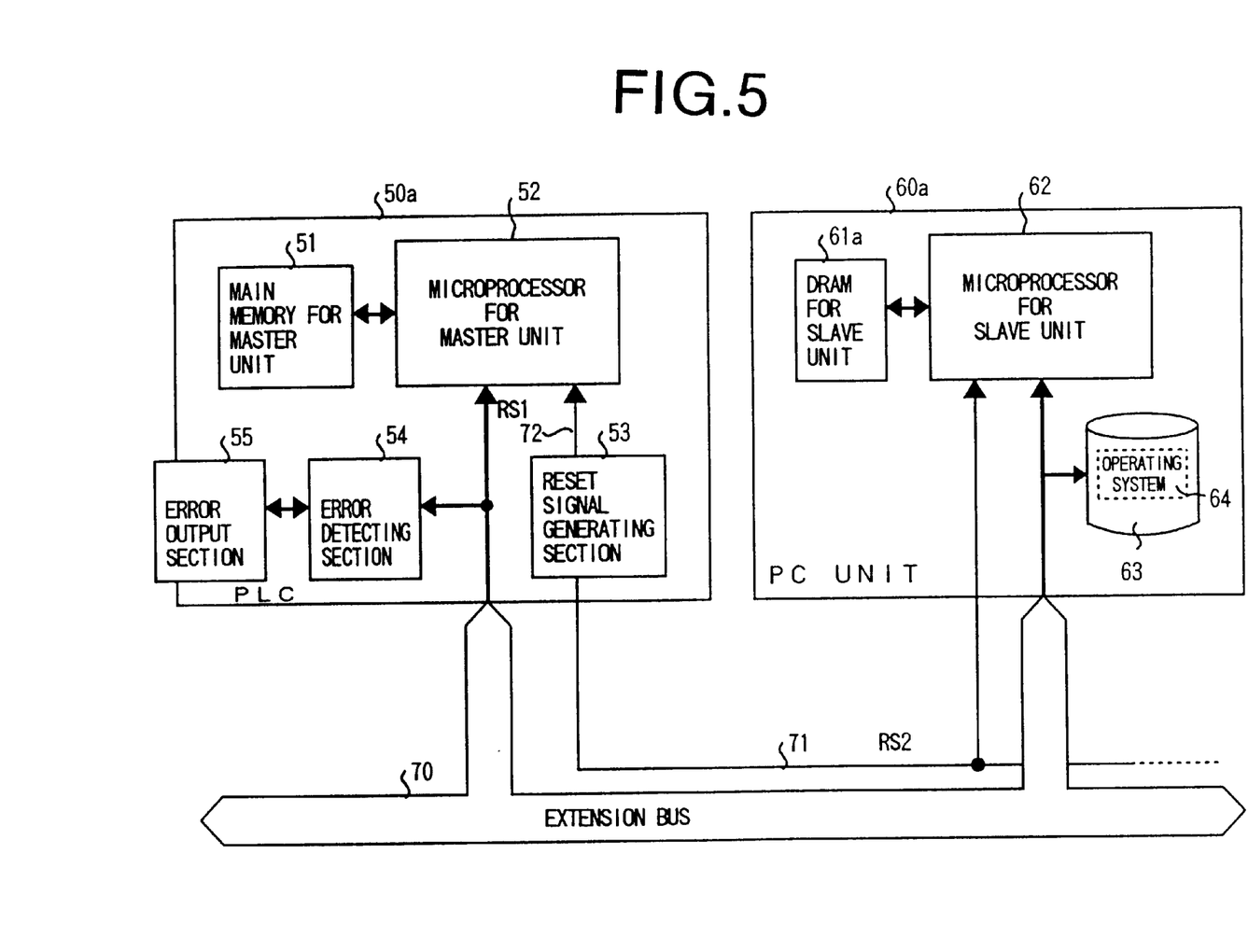
FIG. 5 is a block diagram showing concrete configuration of the communication system based on the conventional art.

Next description is made for a concrete example of use of the communication system shown in FIG. 4. FIG. 5 is a block diagram showing concrete configuration of a communication system based on the conventional technology. The communication system shown in the figure is a more particularized one from the communication system shown in FIG. 4. A programmable controller 50a (described as PLC hereinafter) for managing I/O control at a cite of FA (factory automation) or the like is applied to the master unit 50, and a personal computer unit 60a (described as PC unit hereinafter) having an internal architecture equivalent to that of a personal computer is applied to the slave unit 60.

The PLC 50a has the configuration in which an error detecting section 54 and an alarm output section 55 are furthermore added to internal configuration of the master unit 50 described above. The error detecting section 54 is connected to an internal bus connected to the microprocessor 52 for a master unit, detects an error, and outputs a error detection signal to the alarm output section 55 in the downstream. When the alarm output section 55 receives the error detection signal from the error detecting section 54, it outputs an alarm.

The PC unit 60a has the configuration in which a hard disk drive 63 (described as HDD hereinafter) for building a disk system is furthermore added to the internal configuration of the slave unit 60 described above, and a DRAM 61a for a slave unit is applied to the main memory 61 for a slave unit.

The HDD 63 stores operating systems (described as OS hereinafter) each working as software for starting the microprocessor 62 for a slave unit or various types of application program working according to this OS 64.

The DRAM 61a for a slave unit stores therein OS 64 or various types of application program stored in the HDD 63 according to controls by the microprocessor 62 for a slave system.

Next description is made for operations. In the PLC 50a shown in FIG. 5, the microprocessor 52 for a master unit executes initialization after the reset signal RS1 detected from the reset signal generating section 53 is released. So the PC unit 60a, connected to the PLC 50a, finishes initialization of the internal section before initialization of the PLC 50a is complete, and is waiting for access from the PLC 50a at a point in time when initialization of the PLC 50a is finished.

In the communication system shown in FIG. 5, the slave unit 60 stores the OS 64 or various types of application programs in itself like an example in the PC unit 60a, so that it generally manages the control programs by storing them in the HDD 63 having a large memory capacity.

For this reason, when the reset signal RS2 is released, the PC unit 60*a* executes initialization, namely stores the various programs in the DRAM 61*a* for a slave unit. In other words, in this initialization step, access to the HDD 63 is executed for reading out the OS 64 or the various application programs.

As described above, when the PC unit 60*a* is initialized, access to the hard disk is required, and the access time becomes far longer as compared to a period of time required for access to a ROM or a RAM in the PLC 50*a*. For this reason, in the PC unit 60*a*, the access time may sometimes becomes several minutes in contrast to several seconds in a case of the PLC 50*a*, and thus the time required for initialization of the PC unit 60*a* is substantially longer than that required for the PLC 50*a*.

In the communication system shown in FIG. 5, when the system power is turned ON, or when the hardware reset is released, the PLC 50*a* and the PC unit 60*a* start initialization respectively.

Then when initialization of the PLC 50*a* is finished, at this point of time initialization of the PC unit 60*a* has not been finished. For this reason, even if the PLC 50*a* sends a data send/receive request to the PC unit 60*a*, as the PC unit 60*a* is still in the process of initialization, it can not return a response.

In the case as described above, the error detecting section 54 provided in the PLC 50*a* checks a response time after access, and in a case where there is no response even if a preset period of time for response has passed, the error detecting section 54 determines that an error has occurred in the PC unit 60*a*.

The error detecting section 54 supplies an error detection signal to the alarm output section 55 according to a result of the determination that an error has occurred in the PLC unit 60*a* and makes the latter output an alarm, and also reports to the microprocessor 52 for a master unit that operation of the entire system is stopped for security.

In the conventional technology, because of the difference in a period of time required for initialization between the PLC 50*a* and the PC unit 60*a*, sometimes the entire communication system may be stopped due to delay in initialization of the PC unit 60*a*.

Under the circumstances as described above, in recent years, there has been a communication system in which the PC unit 60*a* can be initialized earlier than the PLC 50*a* by incorporating a delay means such as a software timer in the PLC 50*a* to make initialization of the PLC 50*a* later than that of the PC unit 60*a*.

As the technologies similar to that described above, there are those disclosed in Japanese Patent Laid-Open Publication No. HEI 1-205312, Japanese Patent Laid-Open Publication No. SHO 63-121966, and Japanese Patent Laid-Open Publication No. HEI 4-301952.

Japanese Patent Laid-Open Publication No. HEI 1-20531 discloses a technology for maintaining a reset state of a system where a reset state of a system (master unit) is not released even if reset of a slave unit is released, before passage of a prespecified period of time.

Japanese Patent Laid-Open Publication No. SHO 63-1211966 discloses the technology to delay release of reset of a host CPU (master unit) than release of reset of a slave CPU (slave unit) by using a delay circuit. Japanese Patent Laid-Open Publication No. HEI 4-301952 discloses the technology for a slave unit to execute reset and initialization of its hang-up according to passage of time set by a timer.

In addition to the similar technologies described above, there is, for instance, a technology disclosed in Japanese Patent Laid-Open Publication HEI 4-240946. This publication discloses the technology for controlling initialization of a main station (master unit) which is not working by a slave unit during the normal system operation.

In communication systems based on the conventional technology, as disclosed in each of the patent publications described above, a delay means such as a timer is incorporated for delaying initialization of a master unit, so that a delay time must be set according to a time for initialization corresponding to a memory capacity used by the OS 64 or various types of applications stored in the HDD 63 like in a case of the PC unit 60*a*, and in this case there is a problem related to the hardware that it is difficult to set an optimal delay time for system initialization.

To solve the problems as described above, a communication system is conceivable in which the PLC 50*a* executes polling processing to the PC unit 60*a* to make up a stand-by state until the system is normally initialized from a point of time when initialization of the PLC 50*a* has been finished until a point of time when the PC unit 60*a* becomes ready for accepting access by the PLC 50*a*.

However, for a communication system in which polling processing is executed, a control program for executing the polling processing is required for the PLC 50*a*, there is a problem related to software that the processing becomes complicated.

SUMMARY OF THE INVENTION

It is an object of the present invention to obtain a communication system which can normally be initialized with simple configuration and simple processing in a case where a period of time required for initialization of a slave unit is longer than that for a master unit.

In a case where a period of time for initialization by the slave unit is longer as compared to that by said master unit, the slave unit releases reset thereof and finishes the initialization processing, and then the slave unit releases reset of the master unit and makes the master unit execute initialization processing, so that the slave unit has already started the normal operation at a point of time when the master unit is going to execute initialization processing, whereby the master unit can normally access the slave unit at any time after the master unit finishes initialization processing, which makes it possible to normally start up the system with simple configuration and easy processing.

In a case where there is any slave unit executing initialization processing with a longer period of time as compared to that by the master unit and also with the longest period of time of those by all of the plurality of slave units, the slave unit releases reset thereof and finishes the initialization processing, and then the slave unit releases reset of the master unit and makes the master unit execute initialization processing, so that all the slave units have already started the normal operation in a step when the master unit is going to execute initialization processing, whereby the master unit can successfully access any of the slave units at any time after the master unit finishes initialization processing, which makes it possible to normally start up the system with simple configuration and easy processing.

In a case where a period of time for initialization of the slave unit is longer as compared to that by the master unit, and the slave unit, when a specified period of time longer than a period of time for initialization has passed after reset of the slave unit itself is released, automatically releases reset of the master unit and makes the master unit execute initialization processing, so that the slave unit provides control up to initialization of the master unit even if the slave unit can not finish the initialization processing even after a longer period of time than that for initialization has passed and is supposed to be in an abnormal state, which makes it possible to at least normally start up the system with simple configuration and easy processing.

In a case where there is any slave unit executing initialization processing with a longer period of time as compared to that by the master unit and also with the longest period of time of those by all of the plurality of slave units, the slave unit, when a certain period of time longer than the period of time for initialization has passed after reset of the slave unit itself is released, automatically releases reset of the master unit and makes the master unit execute initialization processing, so that the slave unit provides control up to initialization of the master unit even if the slave unit can not finish the initialization processing even after a longer period of time than that for initialization has passed and is supposed to be in an abnormal state, which makes it possible to at least normally start up the system with simple configuration and easy processing.

The slave unit is disconnected after a certain period of time longer than the period of time for initialization has passed after the reset of the slave unit is released, so that erroneous output from the slave unit to the communication line can be prevented, and with this feature, the master unit after starting up the system can access the slave unit.

Other objects and features of this invention will be understood from the following description with reference to the accompanying drawings.

DESCRIPTION OF THE PREFERRED EMBODIMENT

Next, a detailed description is made for the preferred embodiment of the present invention with reference to the related drawings.

Figure 1:
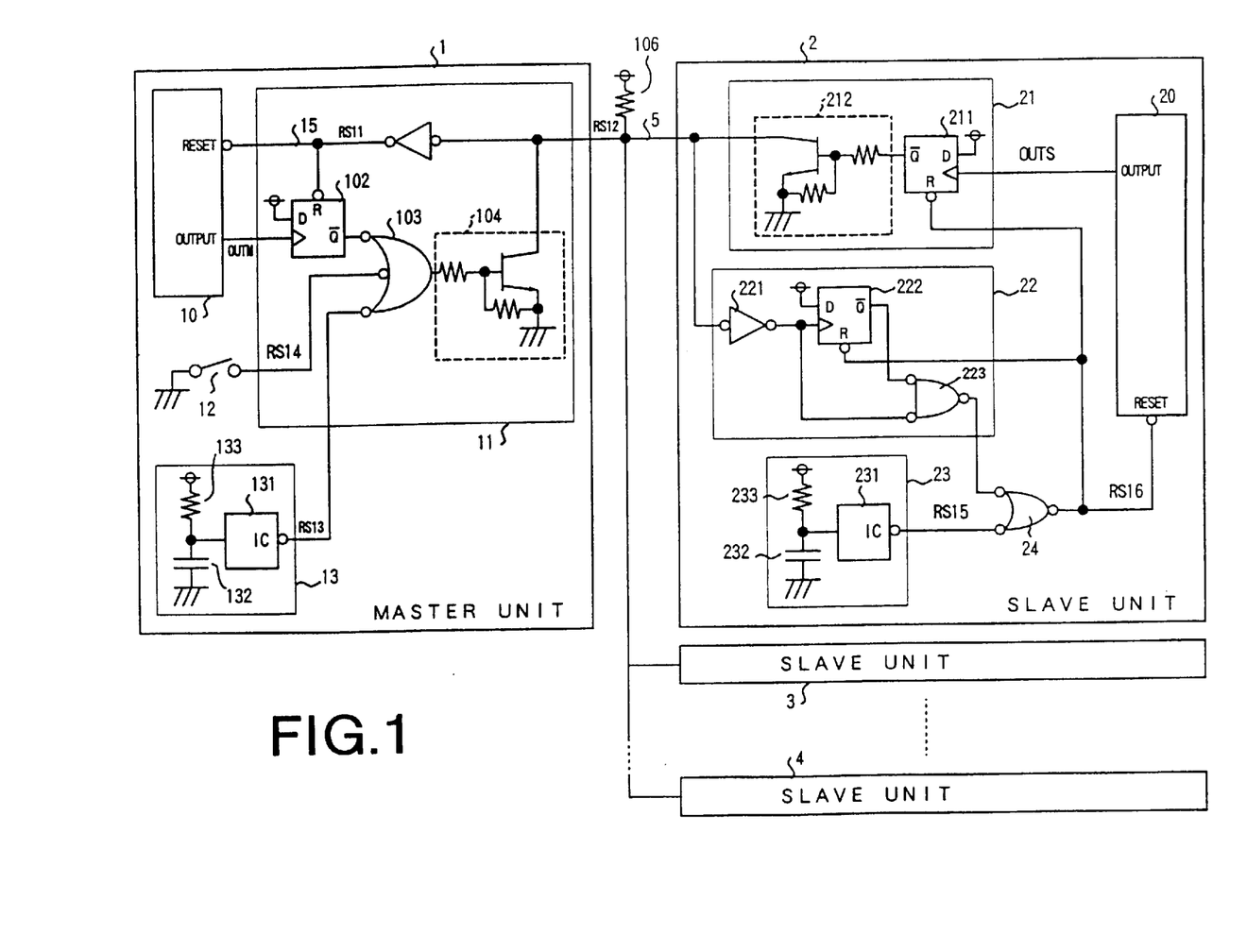
FIG. 1 is a block diagram showing internal configuration of the communication system according to Embodiment 1 of the present invention.

FIG. 1 is a block diagram showing internal configuration of a communication system according to Embodiment 1 of the present invention. In the communication system shown in FIG. 1, for instance, a master unit 1 and a plurality of slave units 2, 3, 4 are connected to each other with an extension bus 70 or a signal line 5 not shown herein like that used in the conventional technology. Although 3 units of slave units 2, 3, 4 are connected to the communication system shown in FIG. 1, the number of units may be one two, or four or more.

The extension bus 70 not shown herein is like in the conventional technology used for data communication between the master unit 1 and each of the slave units 2, 3, 4. Also the signal line 5 is a line through which a reset signal RS12 for system reset is transmitted from the master unit 1 to each of the slave units 2, 3, 4 and is pulled up by a pull-up resistor 106.

The master unit 1 executes data communications through the extension bus 70 or the signal line 5 not shown herein with each of the slave units 2, 3, 4 and controls the entire system. This master unit 1 comprises, for instance, a microprocessor 10 for a master unit, a reset signal generating circuit 11, a reset switch 12, and a power reset circuit 13. It should be noted that, although not shown in the figure, this master unit 1 comprises a main memory for a master unit comprising a ROM or a RAM with various application programs or operation systems stored therein like a main memory 51 for a master unit provided in the master unit 50 described above.

The reset signal generating circuit 11 comprises an amplifier 101, a D type flip-flop 102, a NAND gate 103, and an NPN type of transistor circuit 104, and resets the master unit 1 and the slave units 2, 3, 4 with the reset signals RS11 and RS12.

The amplifier 101 is connected to one edge of the signal line 5 through which the reset signal RS12 to the slave units 2, 3, 4 is transmitted as well as to one edge of a signal line 15 through which a reset signal RS11 to the master unit 1 is transmitted.

The flip-flop 102 connects R (a reset signal) input to the signal line 15, connects input of an output signal OUTM to an output terminal (OUTPUT) of the microprocessor 10 for a master unit, and also connects Q (reversion) output to the NAND gate 103. This flip-flop 102 pulls up the D input.

The NAND gate 103 subjects the Q (reversion) output from the flip-flop 102, a reset signal RS14 from the reset switch 12, and output from the power reset circuit 13 to NAND processing, and outputs the result to the NPN type of transistor circuit 104.

The NPN type of transistor circuit 104 connects a base to the NAND gate 103, a collector to the signal line 5, has an emitter connected to the ground, and, when output from the NAND gate 103 is at a high level, outputs that as a reset signal RS12 to the signal line 5.

The reset switch 12 is a switch manually operated when executing hardware reset (system reset), and when this reset switch 12 is turned ON, a reset signal RS14 is outputted to the NAND gate 103.

The power reset circuit 103 has an IC 131 which detects that a power voltage has reached a level enabling system operation and also outputs a reset signal RS13 when the power voltage is less than the level. In this power reset circuit 13, one edge of the IC 131 is connected to the NAND gate 103 to which the reset signal RS13 is outputted, the other edge thereof is grounded via a capacitor 132, and the pull-up resistor 133 is connected thereto.

The internal configuration of the slave unit 2 shown in FIG. 1 is a representative one of a slave unit in Embodiment 1, and other slave units 3, 4 have the internal configuration common with that of the slave unit 2, so that description thereof is omitted herein.

The slave unit 2 executes data communication through the extension bus 70 or the signal line 5 not shown herein with the master unit 1, and works according to controls by the master unit 1. This slave unit 2 comprises, for instance, a microprocessor 20 for a slave unit, a reset signal release circuit 21, a reset signal input circuit 22, a power reset circuit 23, and an AND gate 24. Although not shown in the figure, this slave unit 2 has the same configuration as that of a DRAM 61a and a HDD 64 each for a slave unit provided in the PC unit 60a described above, and has a function to load as OS or various types of application in a step of initialization by means of hard disk access.

The microprocessor 20 for a slave unit (an initialization control means, a reset release means) controls the entire slave unit 2 according to various types of application program, and for instance, provides controls for initialization of the unit itself or release of reset of the master unit 1 after reset of the unit itself is released. The reset signal release circuit 21 (reset release means) comprises a D type of flip-flop 211 and an NPN type of transistor circuit 212, and configurations and functions of the flip-flop 211 as well as of the NPN type of transistor circuit 212 are the same as those of the flip-flop 102 and the NPN type of transistor circuit 104 described above.

The flip-flop 211 connects an output signal OUTS to an output terminal (OUTPUT) of the microprocessor 20 for a slave unit, connects R input to an output terminal of the AND gate 24, and also connects Q output to a base input terminal of the NPN type of transistor circuit 212.

The reset signal input circuit 22 comprises an input buffer IC 221, a D type of flip-flop 222, and an OR gate 223, and accepts a system reset signal through the signal line 5 from the master unit 1 after system reset for all the slave units 2, 3, 4 has been released.

The flip-flop 222 has the same configuration and functions as those of the flip-flop 221 described above, connects clock input to an output terminal of the amplifier 221, connects R input to the AND gate 24, and also connects Q gate to the OR gate 223.

The OR gate 223 computes OR between output of the amplifier 221 and Q output from the flip-flop 222, and connects the output to an input terminal of the AND gate 24.

The power reset circuit 23 has the same configuration and functions of the power reset circuit 13 in the master unit 1 and also has an IC 231 which checks whether a power voltage has reached a level enabling system operation or not and outputs a reset signal RS15 in a case where the power voltage is less than the level. In this power reset circuit 23, one edge of the IC 231 is connected to the AND gate 24 to which the reset signal RS15 is outputted, the other edge thereof is grounded via a capacitor 232, and a pull-up resistor 233 is connected thereto.

The AND gate 24 generates a reset signal RS16 for the slave unit 2 according to the reset signal RS12 transmitted from the master unit 1 or the reset signal RS15 supplied upon power turn ON from the power reset circuit 23, and outputs the reset signal RS16 to a reset terminal (RESET) of the microprocessor 20 for a slave unit.

Figure 2:
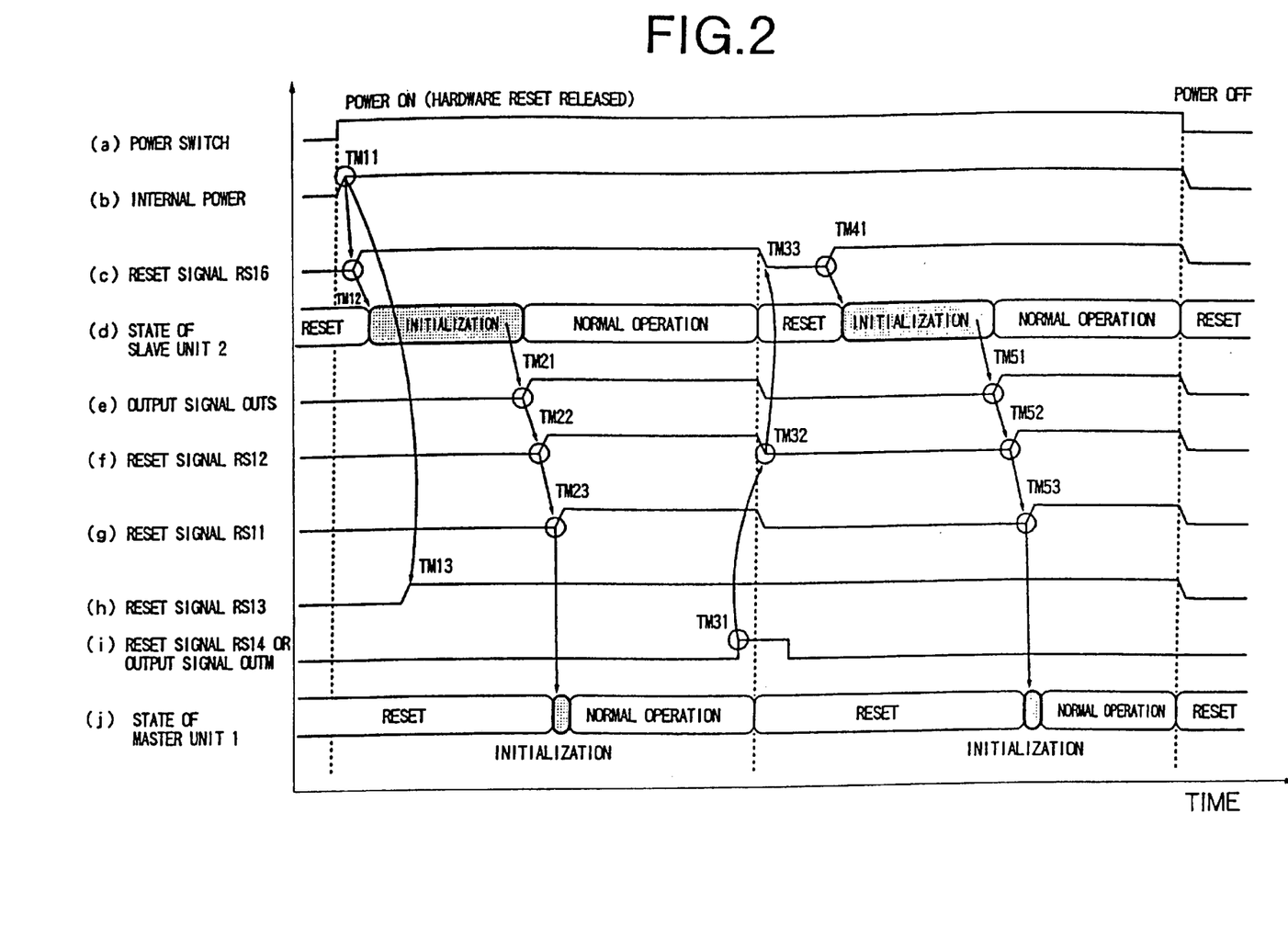
FIG. 2 is a timing chart between the master unit and slave units in the communication system shown in FIG. 1.

Next description is made for operations. FIG. 2 is a timing chart between the master unit and slave units in the communication system shown in FIG. 1, and in this figure TM11 to TM13, TM21 to TM23, TM31 to TM33, TM41, and TM51 to TM53 indicates timing respectively.

In the communication system shown in FIG. 1, at first, when a system power is turned ON (FIG. 2,(a)) and a voltage reaches a level enabling system operation (timing TM11 in FIG. 2(b)), in the slave unit 2, output from the power reset circuit 23 goes to a high level, while in the signal line 5 the reset signal RS12 becomes active (goes to a low level). For this reason, the reset signal RS16, which is output from the AND gate 24, is shifted to a high level (Timing TM12 in FIG. 2(c)). At this timing TM12, the microprocessor 20 for a slave unit detects release of the reset signal RS16 and starts initialization (FIG. 2(d)).

At this point of time, as the signal line 5 is at a low level, the reset signal RS12 is kept active (at a low level) and is not released (FIG. 2(f)), and an output state of the reset signal RS11 (low level) from the reset signal generating circuit 11 to the master unit 10 is maintained (FIG. 2(g)).

In the master unit 1, the internal voltage has reached a level enabling system operation (Timing TM11 in FIG. 2(b)) and the reset signal RS13 has been released (Timing TM13 in FIG. 2(h)), but the microprocessor 10 for a master unit can not detect release of the reset signal RS11, so that the microprocessor 10 can not output an output signal OUTM to the flip-flop 102 (FIG. 2(i)).

In this state, in the master unit 1, even if the reset switch 12 is turned ON, so long as the output signal OUTM is not outputted, it can not change output from the NAND gate 103, nor can shift the signal line 5 to a high level.

For this reason, in this step, as shown in FIG. 2(j), the master unit 1 maintains the reset state.

Then, when the slave unit finishes initialization and the microprocessor 20 for a slave unit detects it, an output signal OUTS is outputted to the reset signal release circuit 21 (Timing TM21 in FIG. 2(e)). Namely in this step, the slave unit 2 becomes capable of receiving access from the master unit 1 and starts preparation for releasing reset of the master unit 1. It should be noted that, in this step, the slave unit 2 starts its operation at least within the unit itself.

This output signal OUTS is outputted to the flip-flop 211, and Q (reversion) output is outputted from this flip-flop 211 to the NPN type of transistor circuit 212. This NPN type of transistor circuit 212 shifts output at a level lower than a collector to a high level according to base input with Q output (reversion) (Timing TM22 in FIG. 2(f)). Namely in the signal line 5, because of effect by the pull-up resistor 106, the active (the low level) state of the reset signal RS12 is released according to the level shift, and the released state is maintained.

When the signal line 5 shifts from a low level to a high impedance state, a signal is inputted into the reset signal input circuit 22, and the locking by the flip-flop 222 is released. When released, the reset signal input circuit 22 becomes capable of receiving a reset signal RS12 from the master unit 1, which has been impossible up to this point of time. Namely, in this step, the slave unit 2 becomes capable of allowing a reset request from the master unit 1, and in this step and on, the master unit 1 plays a leading function, and it becomes impossible for the slave unit 2 to control the master unit 1.

As described above, when the signal line 5 enters the high impedance state, in the reset signal generating circuit 11 in the master unit 1, the reset signal RS1 is released (Timing TM23 in FIG. 2(g)). For this reason, the microprocessor 10 for a master unit detects release of the reset signal RS11 and starts initialization (FIG. 2(j)). When the initialization is complete, the master unit 1 starts its normal operations.

Then in the master unit 1, in a case where base input is executed from the NAND gate 103 to the NPN type of transistor 104 according to an output signal OUTM from the microprocessor 10 for a master unit or the reset signal RS14 generated when the reset switch 12 is turned ON (Timing TM31 in FIG. 2(i)), the signal line 5 shifts from the high impedance state to the low level to set the reset signal RS12 in the active state (Timing TM32 in FIG. 2(f)).

For this reason, the reset signal RS12 arrives in the reset signal input circuit 22 in the slave unit 2 via the signal line 5, and when the reset is accepted, the reset signal RS16 for the internal side of the slave unit 2 is set by the AND gate 24 in the active state (Timing TM33 in FIG. 2(c)).

As a result, as a reset signal RS16 is inputted into a microprocessor 20 for a slave unit, the slave unit 2 is initialized by the microprocessor 20 for a slave unit.

Then, like in the case of system initialization described above, when the slave unit 2 has been initialized, the output signal OUTS is outputted from the microprocessor 20 for a slave unit to the reset signal release circuit 21 (Timing 51 in FIG. 2(e)), and the reset signal RS12 flowing in the signal line 5 is shifted from the active state to the released state (Timing TM52 in FIG. 2(f)). As a result, in the master unit 1, in association with shift of the reset signal RS12 to the reset state, the reset signal RS11 shifts to the reset state (Timing TM53 in FIG. 2(g)), and initialization is started (FIG. 2(j)).

By the way, the reset signal release circuit 21 maintains the reset released state from a point of time when reset is released and the signal line 5 is shifted to the high impedance state until a point of time when the reset signal RS16 goes to the active state when the system power is turned OFF or in response to a reset request from the master unit 1.

This is because system setting is made so that the entire system is controlled by the master unit 1, and for the purpose to prevent any of the slave units 2, 3, 4 from erroneously generating a reset signal corresponding to the reset signal RS12 after the system has been initialized.

With Embodiment 1 of the present invention as described above, in a case where a slave unit requires a longer period of time for initialization as compared to that for the master unit 1, release of system reset when the system power is turned ON or for other reasons is executed by a slave unit, so that the master unit 1 never accesses the slave unit which has not started the normal operation, and with this feature erroneous detection of an error or other fault in the master unit 1 is never made, which makes it possible to normally initialize the system.

Concretely, immediately after the system power is turned ON, reset of a slave unit is released to initialize the slave unit, and during the period of time, the reset state of the master unit 1 is maintained, and after the slave unit has been initialized, the reset state is released to allow the master unit 1 to execute initialization, so that, at a point of time when the master unit 1 executes initialization, the slave unit is already ready for the normal operations, and because of this feature after the master unit 1 has finished initialization, the master unit 1 can access the slave unit at any point of time.

In this case, determination as to whether the reset state has been released or not is made according to the reset signal RS12, so that hand-shake with complicated software is not required and the processing is simplified.

While the master unit 1 and a slave unit are working in the normal conditions, even if the reset switch 12 is operated in the master unit 1, or even if system reset is executed according to a reset operation (output signal OUTM) with the microprocessor 10 for a master unit, at first reset of the slave unit is released to initialize the slave unit, and during this period of time, the reset state of the master unit 1 is maintained, and after the slave unit has been initialized, the reset state is released to enable initialization of the master unit 1.

Also in this case, at a point of time when the master unit 1 starts initialization, the slave unit is already ready for its normal operation, so that, after the master unit 1 has been initialized, the master unit 1 can access the slave unit at any point of time.

Like in Embodiment 1, in a case where a period of time required for initialization varies for each of the slave units 2, 3, 4 each sharing the common internal configuration, system reset may be released by shifting the reset signal RS12 from the active state to the released state at a point of time when the reset signal release circuit 21 executes a reset releasing operation in a slave unit requiring a longer period of time for initialization as compared to that for the master unit and also requiring the longest period of time for initialization of the slave units 2, 3, 4.

In this case, until a point of time when the slave unit requiring the longest period of time for initialization has been initialized, other slave units already having been initialized are together with the master unit 1 kept in the stand-by state. For this reason, also in this case, at the point of time when the master unit 1 starts initialization, all the slave units 2, 3, 4 are ready for their normal operations, so that, after initialization of the master unit 1 has been finished, the master unit 1 can access any of the slave units 2, 3, 4 at any point of time.

As described above, in a case where the slave unit requiring a longer period of time for initialization as compared to that for the master unit 1 has the same circuit configuration as that of the slave unit 2 shown in FIG. 1, a scale of system change is held to the minimum level, and circuit configuration of the slave unit 2 and software processing for it become easier, which makes it possible to construct a low-cost communication system.

In Embodiment 1 described above, a case where reset of the master unit is released after resetting of the slave unit having no inconvenience such as out-of-order or the like is described, but in a case where system reset can not be released due to some inconvenience generated in any slave unit among the plurality of slave units like that in Embodiment 2 described below, the system reset may forcefully be released after a specified period of time has passed.

Figure 3:
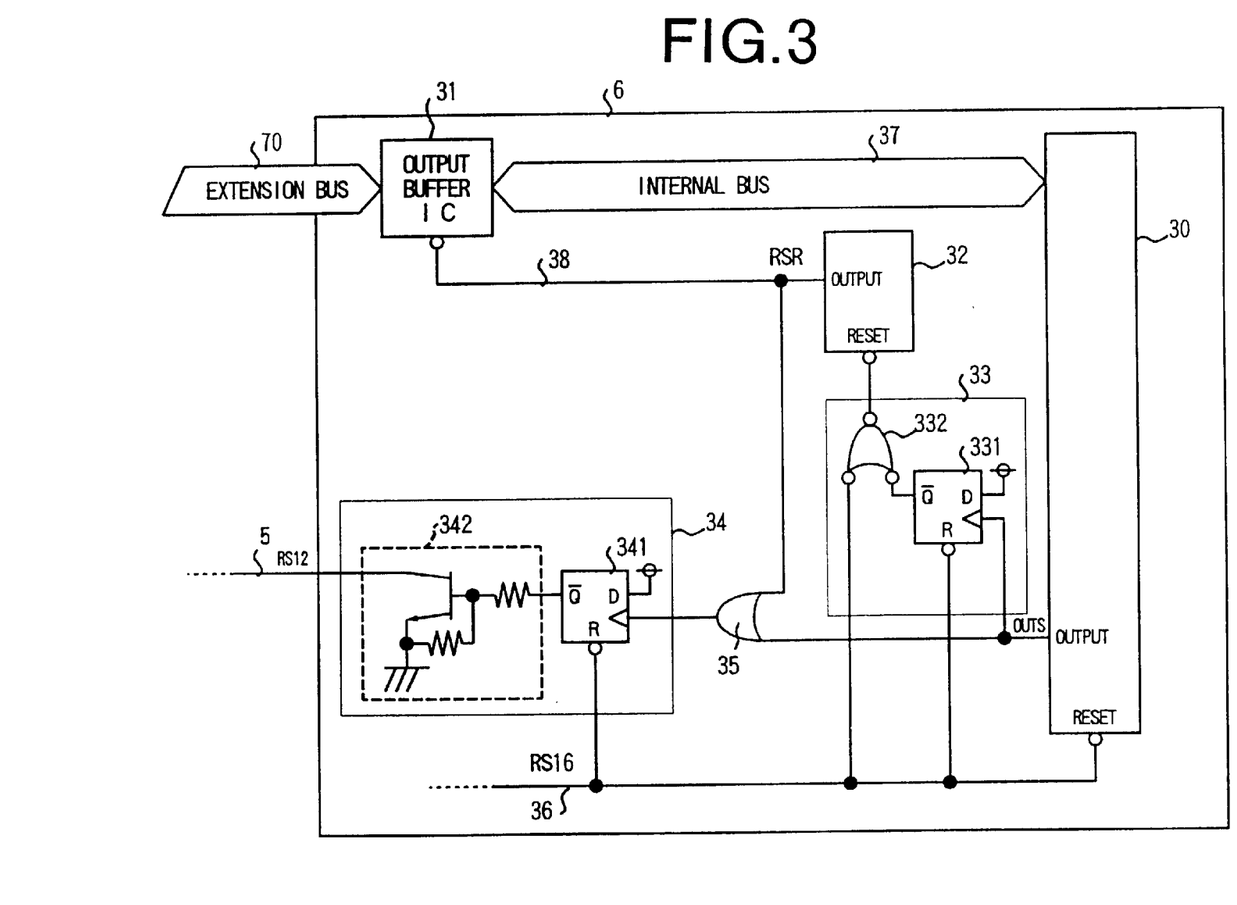
FIG. 3 is a block diagram showing internal configuration of the communication system according to Embodiment 2 of the present invention.

FIG. 3 is a block diagram showing internal configuration of the communication system according to Embodiment 2 of the present invention. Also in the communication system shown in FIG. 3, the master unit 1 and a plurality of slave units (a slave unit 6 as a representative one) both not shown herein are connected to the extension bus 70 and the signal line 5, like in Embodiment 1.

The slave unit 6 executes data communications with the master unit 1 through the extension bus 70 and the signal line 5, and works under controls by the master unit 1. The slave unit 6 comprises, for instance, a microprocessor for a slave unit 30 a buffer IC 31, an on-delay timer circuit 32, a timer reset circuit 33, a reset signal release circuit 34, and an OR gate 35.

It should be noted that the slave unit 6, which is not shown herein, like that in the slave unit 2 described above, comprises a reset signal input circuit 22, a power reset circuit 23, and an AND gate 24 in the same relation of connection therebetween. Namely, the AND gate 24 for transmitting a reset signal RS16 is connected to the edge of the signal line 36 (Refer to a portion indicated by a dotted line).

As for connection, the buffer IC 31 is connected to the microprocessor 30 for a slave unit via an internal bus 37, and the on-delay timer circuit 32 and OR gate 35 are connected to the buffer IC 31 with a signal line 38.

Although not shown in the figure, this slave unit 6 has the same configuration as that of the DRAM 61a and the HDD 64 each for a slave unit provided in the PC unit 60a described above, and has a function to load an OS or various types of application in a step of initialization by accessing hard disk.

The microprocessor 30 for a slave unit (an initialization control means, a reset release means) controls the entire slave unit 6 according to various types of application program, and for instance, provides controls for initialization of the unit itself or release of reset of the master unit 1 after reset of the unit itself is released. The buffer IC 31 (a communication disconnecting means) is a gate for separating the extension bus 70 from the internal bus 37 in the slave unit 6 or for connecting the former to the latter.

The on-delay timer circuit 32 (a timer means) is a circuit for counting a specified period of time set to a value longer than a period of time for initialization of the slave unit itself after reset required from the master unit 1 or reset after the power has been turned ON is released. This on-delay timer circuit 32 resets counting according to an instruction of reset from the timer reset circuit 33, and outputs a reset release signal RSR for releasing the system reset to the OR gate 35 in the rear step.

It should be noted that this reset release signal RSR is supplied to the buffer IC 31 via the signal line 38, and in that step passage of data between the extension bus 70 and the internal bus 37 is disabled, and for that purpose the gate of the buffer IC 31 is closed, so that the signal RSR can function as a gate close signal. Reversely, in a case where the reset release signal RSR is not outputted, a gate of the buffer IC 31 is opened so that data between the extension bus 70 and the internal bus 37 can pass through, and in this case the signal RSR can function as a gate open signal.

The timer reset circuit 33 comprises a D type of flip-flop 331 and an AND gate 332, and controls reset of the on-delay timer circuit 32 according to a level state of the signal line 36 and an output signal OUTS from the microprocessor 30 for a slave unit.

The flip-flop 331 connects R input to the signal line 36 for transmitting a reset signal RS16, connects output terminal (OUTPUT) of the microprocessor 30 for a slave unit to input terminal of an output signal OUTS, and connects Q output to the AND gate 332.

The AND gate 332 connects two inputs to the signal line 36 and to Q output terminal respectively, and connects a result of the AND processing to reset input of the on-delay timer circuit 32.

The reset signal release circuit 34 comprises a D type of flip-flop 341 and NPN type of transistor circuit 342, and configurations and functions of the flip-flop 341 as well as the NPN type of transistor circuit 342 are the same as those of the flip-flop 102 and of the NPN type of transistor circuit 104 described above respectively.

The flip-flop 341 has an input terminal connected to an output terminal of the OR gate 35, connects R input to the signal line 36 for transmitting a reset signal RS16, and connects Q output to a base input terminal of the NPN type of transistor circuit 342. This Q output operates the NPN type of transistor circuit 342, shifts a reset signal RS12 from an active state to a high impedance state, and controls to release reset.

The OR gate 35 has two input terminals connected to the output terminal (OUTPUT) of the microprocessor 30 for a slave unit and to an output terminal (OUTPUT) of the on-delay timer circuit 32 respectively, and connects a result of the OR processing to the flip-flop 341 of the reset signal release circuit 34. When receiving a reset lease signal RSR outputted from the on-delay timer circuit 32 after completing count-up a specified period of time previously set, this OR gate 35 makes the reset signal release circuit 34 release reset.

Next description is made for operations. In the following description for operations the same sections as those in Embodiment 1 described above are not described, and description is made for only the key points.

In a case where a power is turned ON or reset release is requested from the master unit 1 not shown herein, in the slave unit 6, a reset signal RS16 of the signal line 36 shifts to a high impedance state and inside of the unit becomes a reset release state. And for this reason, the microprocessor 30 for a slave unit starts initialization, but there is a case where the microprocessor can not start initialization and can not normally operate for some reason such as a breakdown or the like.

In this case, the microprocessor 30 for a slave unit can not supply an output signal OUTS to the reset signal release circuit 34, and for this reason, the reset signal RS12 maintains an active state in the signal line 5. Namely, there will be no means to release the system reset if the state described above is kept as it is, so that the system will never start up.

To solve the problem described above, at least in the signal line 36, in a case where the reset signal RS16 shifts from an active state to a high impedance state, a signal (a high level) is received by the timer reset circuit 33 connected to the signal line 36, and the timer reset circuit 33 resets the on-delay timer circuit 32 according to the input signal.

In the on-delay timer circuit 32, count-up is started after resetting, and a reset release signal RSR is outputted from the output terminal (OUTPUT) at a point of time when the count-up for a specified period of time previously set is complete. This reset release signal RSR is supplied to the buffer IC 31 as well as to the OR gate 35 via the signal line 38.

When the reset release signal RSR is supplied to the buffer IC 31, and because the reset release signal RSR in this case functions as a gate close signal, the state in which data is allowed to pass through from the extension bus 70 to the internal bus 37 up to then is switched to the state in which the passage is disabled by closing the gate.

The control is executed for a purpose of cutting off communications with outside so that the slave unit 6 which does not normally operate will not erroneously output signals to each unit connected to the same extension bus 70. Accordingly, the slave unit 6 makes a state in which the slave unit is electrically isolated from the extension bus 70, namely actively disconnects communication therefrom, and as described above, the slave unit 6 is supposed not to exist on the system viewed from the master unit 1, so that bad influence to the system can be prevented before the effect actually occurs.

On the other hand, a reset release signal RSR is supplied also to the OR gate 35. The OR gate 35 can send out the reset release signal RSR further to the reset signal release circuit 34 by subjecting it to OR processing even if an output signal OUTS is not supplied from the microprocessor 30 for a slave unit thereto.

Accordingly, the reset release signal RSR outputted from the on-delay timer circuit 32 has a roll for executing reset release with the same effect as that of the output signal OUTS outputted from the microprocessor 30 for a slave unit.

As described above, when a reset release signal RSR is received by the reset signal release circuit 34, the reset signal release circuit 34 starts to release reset without being controlled by the microprocessor 30 for a slave unit. Then the active state of the reset signal RS12 flowing through the signal line 5 is shifted to a high impedance state, and the reset release is complete.

As for the on-delay timer circuit 32, in a case where the microprocessor 30 for a slave unit normally operates, it is necessary to lock a reset release signal RSR not to output the signal RSR on the signal line 38 through the timer reset circuit 33. For this reason, an output signal OUTS outputted from the microprocessor 30 for a slave unit is maintained at an active state (at a high level).

As described above, with Embodiment 2, even if the system reset can not be released even when controlled by the microprocessor 30 for a slave unit due to, for instance, inconvenience occurred in the slave unit 6, release of the system reset can be controlled without controlling by the microprocessor 30 for a slave unit if reset release can be executed inside thereof after a longer period of time than that for initialization of the salve unit 6 is measured by the on-delay timer circuit 32 from a point of time when the reset is released and the specified period of time has passed.

When releasing system reset with the on-delay timer circuit 32, the buffer IC 31 is in a closed state according to the reset release signal RSR, so that the output from the buffer IC 31 becomes a high impedance state, which makes it possible to prevent erroneous output from the slave unit 6 to the extension bus 70.

In the step, the reset signal release circuit 34 can normally operate and shift a reset signal RS12 from the signal line 5 from an active state to a high impedance state, so that the master unit 1 after the system is started up can access any of the slave units except the salve unit 6 in which inconvenience has occurred.

With the present invention as described above, in a case where a period of time for initialization of the slave unit is longer as compared to that by said master unit, the slave unit releases reset thereof and finishes the initialization processing, and then the slave unit releases reset of the master unit and makes the master unit execute initialization processing, so that the slave unit has already started the normal operation at a point of time when the master unit executes initialization processing, whereby the master unit can normally access the slave unit at any time after the master unit finishes the initialization processing, which makes it possible to provide a communication system in which the system can normally be started up with simple configuration and easy processing.

With another feature of the present invention, in a case where there is any slave unit executing initialization processing with a longer period of time as compared to that by the master unit and also with the longest period of time of those by all of the plurality of slave units, the slave unit releases reset thereof and finishes the initialization processing, and then the slave unit releases reset of the master unit and makes the master unit execute initialization processing, so that all the slave units have already started the normal operation at a point of time when the master unit executes initialization processing, whereby the master unit can normally access any of the slave units at any time after the master unit finishes initialization processing, which makes it possible to provide a communication system in which the system can normally be started up with simple configuration and easy processing.

With another feature of the present invention, in a case where a period of time for initialization of the slave unit is longer as compared to that by the master unit, the slave unit automatically releases reset of the master unit and makes the master unit execute initialization processing when a specified period of time longer than a period of time for initialization has passed after reset of the slave unit itself is released, so that the slave unit provides control up to initialization of the master unit even if the slave unit can not finish the initialization processing even after a longer period of time than that for initialization has passed and is supposed to be in an abnormal state, which makes it possible to provide a communication system in which the system can at least normally be started up with simple configuration and easy processing.

With another feature of the present invention, in a case where there is any slave unit executing initialization processing with a longer period of time as compared to that by the master unit and also with the longest period of time of those by all of the plurality of slave units, the slave unit automatically releases reset of the master unit and makes the master unit execute initialization processing when a certain period of time longer than the period of time for initialization has passed after reset of the slave unit itself is released, so that the slave unit provides control up to initialization of the master unit even if the slave unit can not finish the initialization processing even after a longer period of time than that for initialization has passed and is supposed to be in an abnormal state, which makes it possible to provide a communication system in which the system can at least normally be started up with simple configuration and easy processing.

With another feature of the present invention, the slave unit is disconnected after a certain period of time longer than the period of time for initialization has passed after the reset of the slave unit is released, so that erroneous output from the slave unit to the communication line can be prevented, and with this feature, the master unit after starting up the system can access the slave unit, which makes it possible to provide a communication system in which the master unit can accurately detect any abnormal state in the slave unit described above.

This application is based on Japanese patent application No. HEI 8-220176 filed in the Japanese Patent Office on Aug. 21, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A communication system comprising:
    a master unit controlling the entire system which executes initialization processing in a process for resetting the system after a reset of said master unit is released; and
    a slave unit, connected to said master unit with a communication line, which executes initialization processing in said process for resetting the system after a reset of the slave unit is released, where the slave unit has a longer period of time for initialization as compared to that of said master unit; wherein said slave unit comprises:
        an initialization control means for controlling said initialization processing of said slave unit by detecting the release of the reset of the slave unit in said process for resetting the system, and
        a reset release means for releasing the reset of said master unit when said initialization processing is finished according to said initialization control means.

2. A communication system comprising:
    a master unit controlling the entire system which executes initialization processing in a process for resetting the system after a reset of said master unit is released; and a plurality slave units, each connected to said master unit through a communication line, which executes initialization processing in said process for resetting the system after a reset of a particular slave unit is released, where the particular slave unit has a longer period of time for initialization as compared to that of said master unit and also has the longest period of time compared to all of said plurality of slave units; wherein the particular slave unit comprises:
- an initialization control means for controlling said initialization processing of said slave unit by detecting the release of the reset of the slave unit in said process for resetting the system, and
- a reset release means for releasing the reset of said master unit when said initialization processing is finished according to said initialization control means.

3. A communication system comprising:

a master unit controlling the entire system which executes initialization processing in a process for resetting the system after a reset of said master unit is released; and a slave unit, connected to said master unit with a communication line, which executes initialization processing in said process for resetting the system after a reset of the slave unit is released, where the slave unit has a longer period of time for initialization as compared to that of said master unit; wherein said slave unit comprises:
- a timer means for measuring a certain period of time previously set to a value longer than a period of time for initialization of the slave unit after reset of the slave unit is released in said process for resetting the system;
- an initialization control means for controlling said initialization processing of the slave unit by detecting the release of the reset of the slave unit; and
- a reset release means for releasing the reset of said master unit either in a case where said initialization processing is finished according to said initialization control means, or in a case where said measurement of the certain period by said timer means is finished.

4. A communication system according to claim 3; wherein said slave unit comprises a communication disconnecting means for disconnecting said communication line in a case where said measurement of said certain period of time by said timer means is finished.

5. A communication system comprising:

a master unit controlling the entire system which executes initialization processing in a process for resetting the system after a reset of said master unit is released; and a plurality slave units, each connected to said master unit through a communication line, which executes initialization processing in said process for resetting the system after a reset of a particular slave unit is released, where the particular slave unit has a longer period of time for initialization as compared to that of said master unit and also has the longest period of time compared to all of said plurality of slave units; wherein the particular slave unit comprises:
- a timer means for measuring a certain period of time previously set to a value longer than a period of time for initialization of the slave unit after reset of the slave unit is released in said process for resetting the system;
- an initialization control means for controlling said initialization processing of the slave unit by detecting the release of the reset of the slave unit; and
- a reset release means for releasing the reset of said master unit either in a case where said initialization processing is finished according to said initialization control means, or in a case where said measurement of the certain period by said timer means is finished.

6. A communication system according to claim 5; wherein said slave unit comprises a communication disconnecting means for disconnecting said communication line in a case where said measurement of said certain period of time by said timer means is finished.

* * * * *